UNITED STATES PATENT OFFICE.

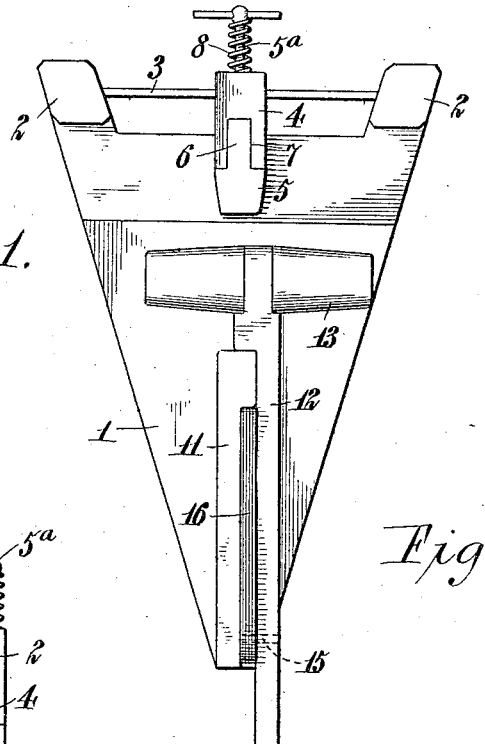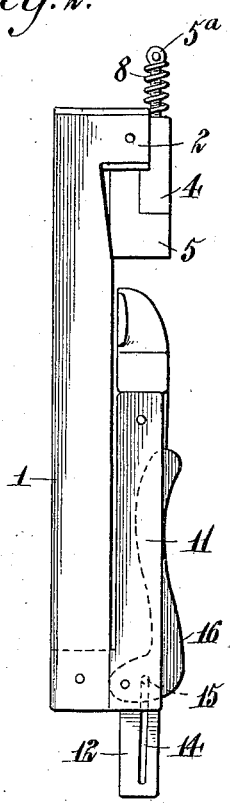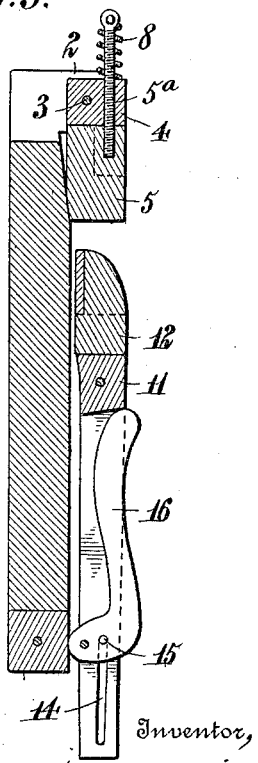

WILLIAM W. JACKSON, OF SPERRY, IOWA.

SAW-SET.

1,054,555.

Specification of Letters Patent.  Patented Feb. 25, 1913.

Application filed June 17, 1911. Serial No. 633,722.

*To all whom it may concern:*

Be it known that I, WILLIAM W. JACKSON, a citizen of the United States, residing at Sperry, in the county of Des Moines and State of Iowa, have invented new and useful Improvements in Saw-Sets, of which the following is a specification.

This invention relates to saw sets and the object of the invention is to provide a simple, cheaply constructed and efficient device of this character having an adjustable setting arm, whereby the engagement of the same with the teeth may be properly controlled so that a wider bearing surface of the hammer upon the teeth may be obtained if desired.

Further objects of the invention will appear as the following specific description is read in connection with the accompanying drawing, which forms a part of this application, and in which:—

Figure 1 is a top plan view. Fig. 2 is a side elevation. Fig. 3 is a section taken on the line 3—3 of Fig. 1.

Referring more particularly to the drawing, 1 represents a base which is substantially V-shaped in outline and has at its base end a pair of upstanding lugs 2 in which is mounted a shaft 3 adapted to receive the setting arm 4. This setting arm comprises two members relatively movable, the outer member 5 having a projecting rib 6 which enters the slot 7 formed in the member 4, so that the member 5 will be properly guided in its movements. A screw 5ª passes through the member 4 and has a loose engagement with the member 5 so that the member 5 may be adjusted outwardly over the inclined anvil 7 of the base 1. A spring 8 surrounds the screw so as to frictionally hold it against accidental rotation.

The pointed end of the base 1 is provided with a slot or notch 9 in which is secured a right angular end 10, and a clamp supporting arm 11 which extends out over the base substantially parallel thereto and has pivoted to its free end a clamping lever 12 upon which a clamping shoe 13 is secured. The opposite end of the lever from the shoe 13 is provided with a longitudinal slot 14 in which a pin 15, carried by the operating lever 16, is adapted to work. This lever lies between the arm 11 and the lever 12 and is pivoted to the former, the pin 15 extending eccentrically therefrom so that when the lever 16 is manipulated the lever arm 14 will be raised or lowered according to the direction of movement and the shoe forced against the base or raised therefrom. Where the saw has been clamped in position upon the base the screw 5ª is manipulated to adjust the hammer portion 5 of the setting arm, so that the proper engagement of the teeth may be obtained.

Having thus described the invention, what I claim as new is:—

A saw setting device comprising a base having an anvil formed thereon, a transverse guide rod mounted on the base, means for clamping a saw to be set against the base with the teeth thereon disposed adjacent said anvil, a setting tool carrier slidable upon said rod lengthwise of the anvil, a setting tool mounted upon the carrier for transverse movement across the anvil, a screw threaded in the carrier and engaged with the tool for adjusting the tool in the carrier, and a spring surrounding this screw to frictionally prevent accidental rotation thereof.

In testimony whereof I affix my signature in presence of two witnesses.

WILLIAM W. JACKSON.

Witnesses:
GUS E. LOFGREN,
CLAUDE L. CONGEE.

Copies of this patent may be obtained for five cents each, by addressing the "Commissioner of Patents, Washington, D. C."